United States Patent [19]

Bowen et al.

[11] 4,284,617
[45] Aug. 18, 1981

[54] SOLID COMPOSITIONS FOR GENERATION FLUORINE AND GASEOUS FLUORINE COMPOUNDS

[75] Inventors: Richard E. Bowen, Woodbridge, Va.; Robert A. Robb, Bryans Road, Md.; Ottmar H. Dengel, Front Royal, Va.; Carl Gotzmer, Accokeek; Frank J. Pisacane, Oxon Hill, both of Md.

[73] Assignee: The United States of America as represented by the Secretary of the Navy, Washington, D.C.

[21] Appl. No.: 99,053

[22] Filed: Nov. 30, 1979

[51] Int. Cl.$^3$ ............................ C01B 7/20; C06B 35/00
[52] U.S. Cl. .................................... 423/504; 423/406; 423/462; 423/464; 252/188.3 R; 252/187 R; 149/17; 149/19.3; 149/35; 149/119; 149/108.2; 149/109.4
[58] Field of Search ............... 423/351, 406, 410, 462, 423/464, 500, 504, 383; 149/19.3, 35, 109.2, 119, 20, 108.2, 109.4, 120, 122, 17; 252/187 R, 188.3

[56] References Cited

U.S. PATENT DOCUMENTS

| | | | |
|---|---|---|---|
| 3,708,570 | 1/1973 | Tolberg et al. | 149/119 X |
| 3,833,432 | 9/1974 | Moy et al. | 149/35 X |
| 3,977,924 | 8/1976 | McCulloch et al. | 149/19.3 |
| 3,980,509 | 9/1976 | Lubowitz et al. | 423/462 X |
| 3,981,756 | 9/1976 | Gotzmer, Jr. | 149/19.3 |
| 4,001,136 | 1/1977 | Channell et al. | 423/351 X |
| 4,003,771 | 1/1977 | Lubowitz | 149/19.3 X |
| 4,120,708 | 10/1978 | Flanagaw | 149/119 X |
| 4,172,884 | 10/1979 | Christe et al. | 149/19.3 X |

*Primary Examiner*—Earl C. Thomas
*Attorney, Agent, or Firm*—R. S. Sciascia; A. L. Branning; J. C. LaPrade

[57] ABSTRACT

A novel solid composition and method for generating fluorine and gaseous fluorine components comprising fluorine rich inorganic oxidizing salts such as tetrafluoro ammonium tetrafluoroborate borofluoride and a high energy fuel selected from the group consisting of metals and metal nitrides together with a complexing agent capable of reacting with and trapping the boron trifluoride combustion by-product.

13 Claims, No Drawings

SOLID COMPOSITIONS FOR GENERATION FLUORINE AND GASEOUS FLUORINE COMPOUNDS

BACKGROUND OF THE INVENTION

Fluorine or gases rich in fluorine are required for many applications that take advantage of fluorination and reactions which comprise such diverse areas such as metal welding, formation of protective coatings or reactants for chemical lasers.

The compositions or methods of the instant invention described in the following disclosure are useful for any applications where fluorine is required and in particular for generators providing reactants for chemical lasers.

Presently fluorine or other gaseous fluorine compounds such as $NF_3$ or $ClF_5$ are stored in gaseous form in high pressure cylinders or as cryogenic liquids at low temperatures. The storage of fluorine or fluorine compounds in gaseous form requires a volume of about 10 times larger than liquid storage.

Therefore it would be readily apparent that it would be greatly beneficial to be able to store gaseous fluorine and fluorine containing compounds in a liquid or solid form. A gas generator utilizing this principle is fully and completely disclosed in this invention.

The storage of fluorine or fluorine compounds embedded in a solid matrix or any other solid form has the advantage of safe, efficient storage at ambient temperature and pressure.

There has been a great deal of effort, time, money and research made to develop solid $F_2/NF_3$ generators. None of these efforts have been, prior to the instant invention completely successful.

SUMMARY OF THE INVENTION

This invention describes several solid compositions and methods for generating a high yield of pure $F_2/NF_3$ gas mixtures with a available fluorine yield as high as 44%.

The reaction that produces the fluorine/$NF_3$ is triggered in a solid composition. Solid composition usually consist of a fluorine rich inorganic oxidizing salt together with a fuel comprising metal nitrides, azides or metals all of which are capable of reacting with available fluorine to produce the corresponding metal fluoride or metal fluoride and nitrogen.

The solid composition also usually contains a complexing agent capable of reacting with and trapping the $BF_3$ combustion byproduct.

In addition a coolant may be added to the solid composition. These coolants are inorganic salts which are unstable and decompose endothermically at elevated temperatures lowering the reaction temperature.

GENERAL DESCRIPTION OF THE INVENTION

The solid fluorine gas generator formulations described use tetrafluoroammonium salts as a source of fluorine. The most preferred salts for use in this invention are listed as follows: $NF_4BF_4$, $NF_4SbF_6$, $(NF_4)_2SiF_6$, $(NF_4)_2GeF_6$, $NF_4AsF_6$ and $NF_4SB_2F_{11}$.

Table I that follows this description indicates the amount of available fluorine in these compounds as well as the total fluorine concentration in each of them.

TABLE 1

| | Fluorine concentration of $NF_4^+$- Salts | | |
|---|---|---|---|
| $NF_4^+$- Salt | MW | Total Fluorine Concentration (%) | Available Fluorine (%) |
| $NF_4BF_4$ | 177 | 86 | 54 |
| $NF_4SbF_6$ | 326 | 58 | 29 |
| $(NF_4)_2SiF_6$ | 322 | 83 | 59 |
| $(NF_4)_2CeF_6$ | 367 | 72 | 52 |
| $NF_4AsF_6$ | 279 | 68 | 34 |
| $NF_4Sb_2F_{11}$ | 443 | 64 | 21 |

The aforesaid inorganic salts are combined in the solid composition with a fuel, particularly metals, metal nitrides, or azides which react with part of the available fluorine to produce the corresponding metal fluoride or metal fluoride and nitrogen.

The following fuels have been found satisfactory and are in fact preferred. The following fuels AlN, BN, $Mg_3N_2$, $Ca_3N_2$, $Li_3N$, $Si_3N_4$, $NaN_3$, B, Si, Mg, Sn, NbN, $Ba_3N_2$, $CsN_3$, CrN, $Cu_3N$, GaN, $Ge_3N_4$, HfN, $P_3N_5$, $KN_3$, $RbN_3$, $Sr_3N_2$, TaN, ThN, TiN, VN, YN, $Zn_3N_2$, ZrN, $LiN_3$.

The energy required to drive the reaction to completion can be acquired by the addition of any of the above fuels.

The exothermic reaction between the tetrafluoroammonium salt and fuel decomposes the remaining tetrafluoroammonium salt to produce the corresponding metal fluoride, nitrogen and $NF_3$. $BF_3$ produced in the reaction is complexed or is reacted with a complexing agent preferably a metal fluoride such as LiF to trap $BF_3$ as a tetrafluoroborate salt.

The complexing agents that have been used in most instances are selected from the group consisting of LiF, NaF and KF.

In the above described reaction lithium fluoride is required to complex $BF_3$. If all of the lithium fluoride required to complex $BF_3$ were supplied by $Li_3N$, reaction temperatures would exceed the disassociation temperatures of $LiBF_4$ releasing $BF_3$ to the gas phase. The choice of complexing agent used is thus depended upon reaction temperature and the thermal stability of the tetrafluoroborate.

Coolants can be added to decrease the reaction temperature, thus preventing the decomposition of the metal tetrafluoroborate to metal fluoride and $BF_3$. Table II lists coolants and the corresponding exdothermic reactions.

TABLE II

| Fluorine Releasing Coolants | | |
|---|---|---|
| Reaction | | Heat of Decomposition Kcal/$_{mole}$ |
| $CoF_3$ | $CoF_2 + \frac{1}{2} F_2$ | +28 |
| $CrF_3$ | $CrF_2 + \frac{1}{2} F_2$ | +84 |
| $FeF_3$ | $FeF_2 + \frac{1}{2} F_2$ | +56 |
| $MnF_3$ | $MnF_2 + \frac{1}{2} F_2$ | +56 |
| $AgF_2$ | $AgF + \frac{1}{2} F_2$ | — |

BRIEF DESCRIPTION OF THE PREFERRED EMBODIMENTS

The following compositions are preferred.

| A | | B | |
|---|---|---|---|
| $NF_4BF_4$ | 89.47 wt % | $NF_4BF_4$ | 70.80 wt % |
| LiF | 8.42 wt % | KF | 23.20 wt % |
| $Li_3N$ | 2.11 wt % | $NaN_3$ | 6.00 wt % |

| C | |
|---|---|
| 4BF$_4$ | 70.00 wt % |
| KF | 23.00 wt % |
| Sn | 7.00 wt % |

The powdered ingredients are mixed thoroughly and the resulting composition pressed into pellets. Ignition may be achieved with a hot wire, or other acceptable means of ignition.

SEPARATION OF BF$_3$

For certain applications it may be desirable to separate the complexing agent from the basic fluorine generating formulation and eliminate BF$_3$ by passing the gas mixture through a reactive bed consisting of complexing agents such as LiF and coolants such as CoF$_3$.

BINDERS

Both the fluorine generating formulations and the gas screening formulations may require well defined amounts of binders to achieve the required physical integrity and to aid mixing of ingredients. Potential binders are Teflon/Vydax, and/or (NPF$_2$)$_n$.

For preparation of homogeneous mixtures and to reduce sensitivity during processing, these binders must be soluble in solvents compatible with all other ingredients. As solvents for (NPF$_2$)$_n$ binders, perfluorocyclohexane, 1,2-dichlorohexafluorocyclobutane, perfluorooctonitrile, and hexafluorobenzene have been found satisfactory. Other fluorocarbon solvents may be also applicable.

ALTERNATIVE COMPOSITION

Similar reaction schemes for generation of fluorine or fluorine containing compounds can be formulated with other NF$_4$$^+$—salts listed in Table I. The reaction:

NF$_4$SbF$_6$ + NaN$_3$ → NaSbF$_6$ + NF$_3$ + ½ F$_2$ + 1½ N$_2$ may serve as an example.

EXAMPLE 1

70.75 grams of NF$_4$BF$_4$ is mixed with 23.25 grams of KF and 600 grams of Sn. Each of these compounds is in powder form and after mixing the composite is pressed into pellets.

These pellets are ignited, with a hot wire. The gasses recovered from the ignition of the solid pelleted composition are as follows

| Theoretical Yield (wt %) F | Experimental Yield (wt %) F | | |
|---|---|---|---|
| 34.1 | 35.2 | | |
| F$_2$(M %) theoretical | NF$_3$ | | |
| | Exp | Theoretical | Experimental |
| 42.8 | 42.0 | 56.9 | 53.4 |
| N$_2$ | | Density | |
| theoretical | Experimental | | |
| 0.1 | 4.5 | 2.2 | |

It should be noted that the experimental yield of 4.5% greatly exceeds the theoretical yield of 0.1%.

EXAMPLE 2

In this example 89.5 gms of NF$_4$BF$_4$ are mixed with 8.4 LiF and 2.1 gms of Li$_3$N. All of these compounds are powdered. After mixing of these three (3) ingredients the mixture is pressed into pellets.

These pellets are ignited with a hot wire. The gases recovered from the ignition of the solid pelleted composition are recovered in the following quantities:

| Theo. Yield (wt %) F | Exp Yield (wt %) F | F$_2$ | | NF$_3$ | | N$_2$ | |
|---|---|---|---|---|---|---|---|
| | | Theo | Ex-per. | Theo | Ex-per. | Theo | Ex-per. |
| 44.4 | 46 | 36.4 | 31.1 | 63.6 | 59.6 | 0.0 | 9.4 |

It should be noted that the 46% experimental yield of F exceeds the 44.4% theoretical yield of F. This is a very high yield and is unexpected.

The examples are only intended to be illustrative, since obvious modifications and equivalents in the invention will be evident to those skilled in the chemical arts, and propose to be bound solely by the appended claims.

What is claimed as new and desired to be secured by Letters Patent of the United States is:

1. Solid compositions for generating fluorine and gaseous fluorine containing compounds comprising:
   (a) a fluorine containing inorganic oxidizing salt
   (b) an alkali metal fluoride complexing agent
   (c) a primary fuel selected from the group consisting of metals, and metal nitrides and metal azides
   (d) a fluorine releasing coolant.

2. The composition of claim 1 wherein the primary fuel is present in an amount exceeding 10% of the total weight of the composition.

3. The composition of claim 1 wherein the fluorine containing oxidizing salt is a tetrafluoroammonium salt.

4. The composition of claim 1 wherein the alkali metal fluoride complexing agent is selected from the group consisting of LiF, NaF and KF.

5. The composition of claim 1 wherein the coolant decomposes endothermically at elevated temperatures to release fluorine gas.

6. The composition of claim 1 wherein the inorganic oxidizer is a tetrafluoroammonium salt.

7. The composition of claim 1 wherein the metal fuel is selected from the group consisting of B, Si, Mg, and Sn.

8. The composition of claim 1 wherein the metal nitride or azide is selected from the group consisting of AlN, BN, Mg$_3$N$_2$, Li$_3$N, Si$_3$N$_4$, NaN$_3$, Ba$_3$N$_2$, CsN$_3$, CrN, Cu$_3$N, GaN, Ge$_3$F$_4$, HFN, P$_3$N$_5$, KN$_3$, RbN$_3$, Sr$_3$N$_2$, TaN, ThN, TiN, Zn$_3$N, ZrN and LiN$_3$.

9. The composition of claim 1 wherein the coolant is CoF$_3$.

10. The composition of claim 1 wherein the fuel is selected from the group consisting of Sn, LiN$_3$, NaN$_3$ AlN, BN, CaN$_2$, LiN$_3$, Si, NbN, Ba$_3$N$_2$, CsN$_3$ and CrN.

11. A method for generating fluorine gas and gaseous fluorine containing compounds and comprising the steps of utilizing a solid composition comprising a tetrafluoroammonium salt, an alkali metal fluoride and a fuel selected from the group consisting of metals, metal azides, and metal nitrides together with a coolant capable of producing fluorine; and igniting the composition so as to release fluorine gas.

12. The method of claim 11 further characterized in that the tetrafluoroammonium salt is selected from the group consisting of NF$_4$BF$_4$, NF$_4$SbF$_6$, (NF$_4$)$_2$ SiF$_6$, (NF$_4$)$_2$GeF$_6$, NF$_4$AsF$_6$ and NF$_4$Sb$_4$F$_{11}$.

13. The method of claim 11 wherein one mole of the tetrafluoroammonium salt is reacted with sufficient fuel to sustain combustion so as to maximize the yield of NF$_3$.

* * * * *